United States Patent
Veladanda et al.

(10) Patent No.: US 10,277,406 B1
(45) Date of Patent: Apr. 30, 2019

(54) AUTHENTICATION PROCESS FOR ISSUING SEQUENCE OF SHORT-LIVED DIGITAL CERTIFICATES

(71) Applicant: DigiCert, Inc., Lehi, UT (US)

(72) Inventors: Hari Veladanda, Pleasanton, CA (US); Hoa Ly, San Jose, CA (US); Gaurav Khanna, Sunnyvale, CA (US)

(73) Assignee: DigiCert, Inc., Lehi, UT (US)

( * ) Notice: Subject to any disclaimer, the term of this patent is extended or adjusted under 35 U.S.C. 154(b) by 938 days.

(21) Appl. No.: 14/478,398

(22) Filed: Sep. 5, 2014

(51) Int. Cl.
  *G06F 21/00* (2013.01)
  *H04L 29/06* (2006.01)
  *H04L 9/32* (2006.01)
  *H04L 9/30* (2006.01)
  *H04L 9/08* (2006.01)

(52) U.S. Cl.
  CPC .......... *H04L 9/3268* (2013.01); *H04L 9/0825* (2013.01); *H04L 9/30* (2013.01)

(58) Field of Classification Search
  CPC ........ H04L 9/3268; H04L 9/0825; H04L 9/30
  See application file for complete search history.

(56) References Cited

U.S. PATENT DOCUMENTS

| | | | | |
|---|---|---|---|---|
| 6,959,382 B1 * | 10/2005 | Kinnis | .................. | G06F 21/602 713/168 |
| 7,853,995 B2 * | 12/2010 | Chow | ................. | H04L 63/0807 713/175 |
| 8,392,712 B1 * | 3/2013 | Wilson | .................... | H04L 63/08 713/175 |
| 2002/0013898 A1 * | 1/2002 | Sudia | ..................... | G06Q 20/02 713/155 |
| 2002/0049681 A1 * | 4/2002 | Herreweghen | ........ | G06Q 20/04 705/64 |
| 2006/0004662 A1 * | 1/2006 | Nadalin | .................. | H04L 63/02 705/50 |
| 2007/0118875 A1 * | 5/2007 | Chow | ................. | H04L 63/0807 726/2 |
| 2013/0086377 A1 * | 4/2013 | Cilfone | .................. | H04L 9/085 713/156 |
| 2015/0052585 A1 * | 2/2015 | Matthews | ........... | H04L 63/0823 726/4 |

FOREIGN PATENT DOCUMENTS

EP 2882156 A1 * 6/2015 ............. H04L 9/321

OTHER PUBLICATIONS

Xinli Wang, Yan Bai, Lihui Hu; "Certification with Multiple Signatures"; Sep. 2015; RIIT '15: Proceedings of the 4th Annual ACM Conference on Research in Information Technology; Publisher: ACM; pp. 13-18 (Year: 2015).*

* cited by examiner

*Primary Examiner* — Kendall Dolly
*Assistant Examiner* — Courtney D Fields
(74) *Attorney, Agent, or Firm* — Knobbe, Martens, Olson & Bear LLP (57) ABSTRACT

Embodiments presented herein provide techniques for managing a digital certificate enrollment process. In particular, embodiments presented herein provide techniques for a certificate authority to issue short-lived SSL certificates and an authentication method for validating certificate signing requests (CSR) for short-lived certificates.

18 Claims, 6 Drawing Sheets

AUTHENTICATION PROCESS FOR ISSUING SEQUENCE OF SHORT-LIVED DIGITAL CERTIFICATES

BACKGROUND

Field

Embodiments of the invention generally relate to techniques for a certificate authority to issue digital certificates. More specifically, embodiments presented herein provide an authentication process allowing a certificate authority to automatically issue a sequence of short-lived digital certificates in response to certificate requests.

Description of the Related Art

Providing secure communication and protecting sensitive data is a well-known issue in a broad variety of contexts. For example, it is common for computer servers to use digital certificates to associate a server with a network domain. In such cases, clients use information contained in a certificate to verify the identity of a server and to establish a secure communication session with that server (e.g., an SSL or TLS session). More generally, digital certificates and public key infrastructure (PKI) techniques are used to create, distribute, and manage cryptographic keys used in a variety of contexts.

Typically, a certificate authority (CA) issues a requesting party a digital certificate only once that party completes an enrollment process. The enrollment process includes a certificate authority verifying the identity of the party requesting a digital certificate and the authority of the requesting party to, in fact, request that digital certificate. Once verified, the requesting party can generate a certificate signing request (CSR) submitted to the CA. Given the requirements for issuing a digital certificate, certificate authorities typically issue certificates with a long validity period, e.g., for one, two, or three years (or more). Further, digital certificates are typically based on public/private key pairs with large key sizes, e.g., 4096 bits for an RSA based certificate. If a private key associated with a certificate is compromised (or the certificate is no longer needed), then the certificate can be revoked and listed in a certificate revocation list (CRL) maintained by the CA. Once expired (or revoked), a party typically has to repeat the enrollment process to obtain another certificate.

With the rapid adoption of cloud computing platforms, web (and other application) servers are now frequently deployed in the cloud to exploit the scalability and the high performance offered by this platform. However, moving to a cloud deployment moves a server from being hosted in a closed, physically controlled environment to a globally distributed open space with less physical security. Private keys hosted in such environments may become accessible to individuals with access to the physical machines hosting a virtual computing instance. This extends the surface of attacks for secure web and application servers, particularly for attacks that compromise the private key, leaving communications secured with the corresponding certificate subject to eavesdropping for the remainder of the (potentially years-long) validity period, unless the compromise is discovered.

Further, there has been a rapid increase in the number and type of network aware devices. For example, in addition to smart phones and computing tablets, network enabled devices now include consumer devices, e.g., lighting, thermostats, appliances and both commercial and industrial equipment, e.g., security systems, SCADA devices, etc. The large key size used for most commercial digital certificates can strain the resources of these devices when establishing a secure session with a server. Similarly, the large key sizes can strain the resources of a server when responding to high request volumes.

SUMMARY

One embodiment presented herein includes a method for issuing a sequence of short-lived digital certificates. This method may generally include receiving a certificate signing request (CSR). The CSR includes a public key to be listed in a digital certificate, a first digital signature, and a second digital signature. This method may also include validating whether the first digital signature was generated using a first private key, the first private key corresponding to the public key to be listed in the requested digital certificate. This method may also include validating whether the second signature was generated using a second private key, the second private key corresponding to a public key listed in a digital certificate previously issued to a party submitting the CSR. Upon validating the first and second digital signatures, the requested digital certificate is issued to the party submitting the CSR.

In a particular embodiment, the first signature is generated based on the content of the CSR. Also, the second signature may be generated based on the content of the CSR, excluding attributes identified in the CSR.

Still another embodiment includes a computer-readable storage medium storing instructions, which, when executed on a processor, performs an operation for issuing a sequence of short-lived digital certificates. The operation itself may generally include receiving a certificate signing request (CSR). The CSR includes a public key to be listed in a digital certificate, a first digital signature, and a second digital signature. This operation may also include validating whether the first digital signature was generated using a first private key, the first private key corresponding to the public key to be listed in the requested digital certificate. This operation also include validating whether the second signature was generated using a second private key, the second private key corresponding to a public key listed in a digital certificate previously issued to a party submitting the CSR. Upon validating the first and second digital signatures, the requested digital certificate is issued to the party submitting the CSR.

Still another embodiment includes a system having a processor and a memory hosting an application, which, when executed on the processor, performs an operation for issuing a sequence of short-lived digital certificates. The operation itself may generally include receiving a certificate signing request (CSR). The CSR includes a public key to be listed in a digital certificate, a first digital signature, and a second digital signature. This operation may also include validating whether the first digital signature was generated using a first private key, the first private key corresponding to the public key to be listed in the requested digital certificate. This operation also include validating whether the second signature was generated using a second private key, the second private key corresponding to a public key listed in a digital certificate previously issued to a party submitting the CSR. Upon validating the first and second digital signatures, the requested digital certificate is issued to the party submitting the CSR.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Embodiments presented herein provide techniques for managing a digital certificate enrollment process. In particular, embodiments presented herein provide techniques for a certificate authority to issue short-lived SSL certificates and an authentication method for validating certificate signing requests (CSR) for short-lived certificates.

In one embodiment, a CA performs a full identity investigation and authentication process when a party initially requests a digital certificate. However, once this enrollment process is complete, and the party submits a CSR, the CA issues a short-lived digital certificate. Rather than issue certificates having a multiple-year validity period, a short-lived certificate may have a validity period of a few days, (e.g., one week). Prior to the expiration of that certificate (e.g., after five days), the server generates a new key pair and certificate signing request (CSR) to submit to the CA. In addition to signing the CSR with the new private key; however, the server also signs some content of the CSR using the private key of the current digital certificate. For example, the server may generate a second digital signature by using the previous private key to sign a hash of the new certificate content, excluding the certificate attributes.

The subsequent certificate request generated by the server goes through an automatic approval process at the CA to ensure that certificate fulfillment happens before the current certificate expires. Since each subsequent certificate does not go through the same rigorous enrollment process as the initial certificate, the extra signature included in the CSR is used to prove to the CA that the requesting server holds the private key for the previous certificate. In addition, the subject distinguished name in the new CSR may be ignored. Instead, the CA may use the original subject distinguished name for all subsequent certificates. Doing so prevents a party who held a legitimate web server certificate from obtaining a certificate for another end-entity. In addition, the current certificate must still be valid, and not revoked, when the CSR for the next certificate is submitted.

With short-lived certificates, the server key pairs are generated much more frequently than typically occurs. As a result, each key pair protects a smaller set of transactions. Doing so mitigates the additional risk factor posed by cloud computing (i.e., where a web server is hosted on a virtual machine instance in the cloud and the operator of that web server does not control the physical security of the system hosting the virtual machine instance). If one private key is compromised, only a small set of transactions associated with the compromised key are exposed, as the short-lived certificate is always "about to expire." This approach is particularly beneficial for high traffic web servers where tens-of-thousands of transactions are served up per second. By the same token, web servers may use certificates smaller key sizes to maintain high performance, yet still have the strong security level by generating new key pairs more often to shorten the exposure window. That is, the short validity period limits the time window for an intensive cryptanalytic attack against a server's then current private key. And as a result, a server can use a smaller key size to establish a secure session (or perform other cryptographic operations). Thus, the server can support larger numbers of substantially simultaneous sessions. Similarly, client devices with limited computing power (e.g., unconventional network aware devices such as thermostats, lighting, and appliances) can negotiate a secure session more efficiently.

Note, embodiments of the invention are described below using a web-server as an example of an application which uses SSL certificates to secure communications between the web-server and client systems. As described, the web-server generates CSRs for short-lived certificates; signed using both the private key corresponding to the public key named in the CSR as well as signed using the private key corresponding to the current short-lived certificate. One of ordinary skill in the art will recognize that embodiments described herein may be adapted to work with a variety of computing applications which request digital certificates from a CA using a certificate signing request (CSR). For example, embodiments may be used with virtualized systems and infrastructure, stand-alone computing appliances, network devices, data storage devices, and unconventional network-aware devices capable of hosting a digital certificate used to secure communications with other entities and capable of generating CSRs sent to a CA for fulfillment.

Figure 1:
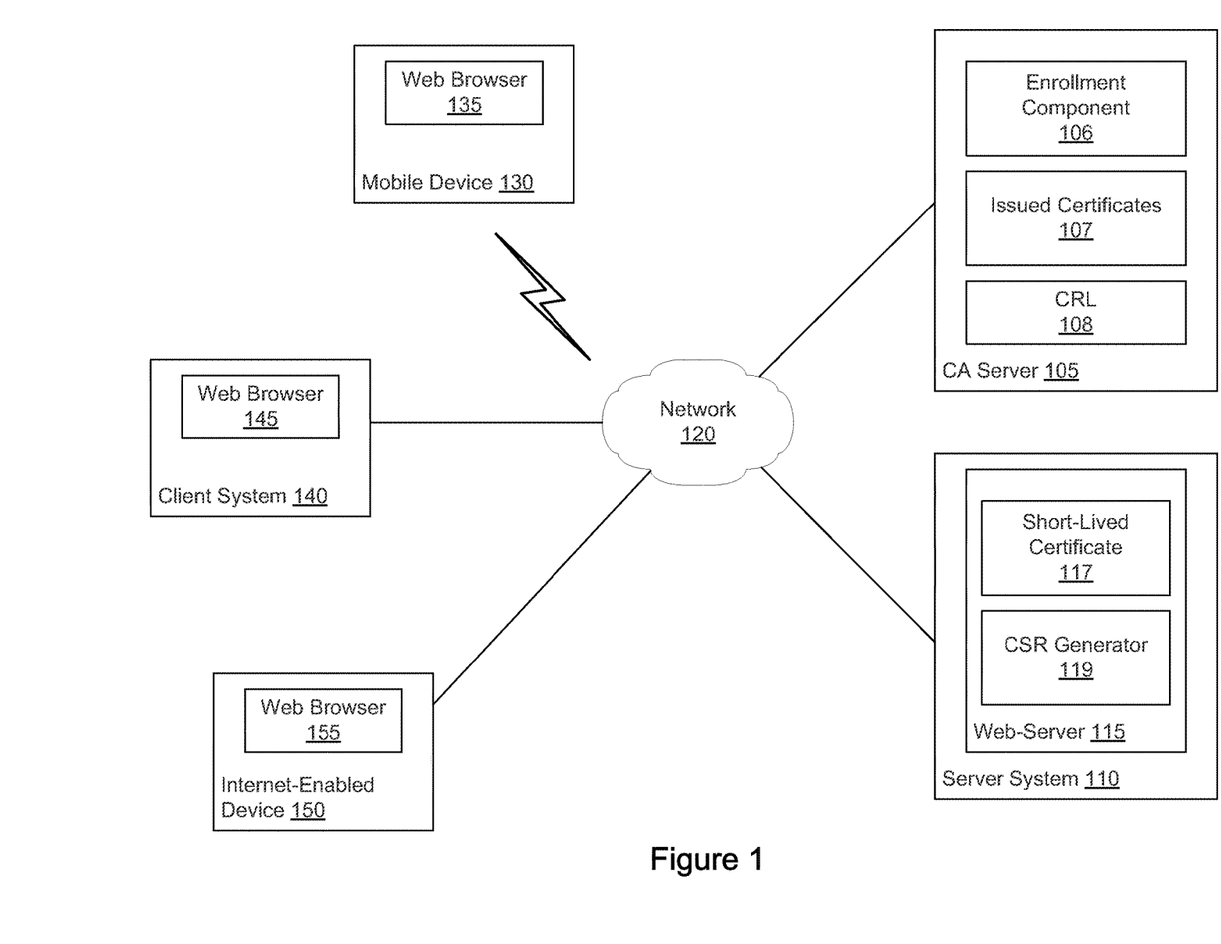
FIG. 1 illustrates an example computing environment, according to one embodiment.

FIG. 1 illustrates an example computing environment 100, according to one embodiment. As shown, the computing environment 100 includes a certificate authority (CA) server 105, a server system 110, a mobile device 130, a client system 140, and an internet enabled device 150, each connected to a network 120 (e.g., the internet). The server system 110 includes a web-server 115, which itself includes a short-lived certificate 117 and a CSR generator 119.

The server system 110 is included to be representative of a physical computing system, as well as representative of virtual machine instances deployed to a computing cloud. The web-server 115 is included to be representative of a variety of web-server applications (e.g., apache or nginix) configured to communicate with client systems using HTTPS and related protocols. Web-server 115 may also communicate with other applications on server system 110 (or other systems), such as an application server and a database to respond to requests from clients 130,140, and 150.

Client system 140 is generally included to be representative of a general purpose computing system, such as a desktop or laptop computer. As shown, the client system 140 includes a web-browser used to communicate with web-server 115. Mobile device 130 is generally included to be representative of small mobile computing devices, such as smart phones and computing tablets. Like client system 140, the mobile device 130 executes a web-browser 135 in order to communicate with web-server 115. Internet-enabled device 150 generally includes any other device capable of communicating over network 120, e.g., consumer products such as thermostats, appliances, televisions, etc. that include a network interface—sometimes referred to as "the internet of things." Device 150 includes a web-client 155 used to establish a communication session (including secure sessions) with web-server 115.

Short-lived certificate 117 is used to bind a network domain (e.g., www.symantec.com) to the server 115. Doing so allows the web-server 115 to "prove" its identity to clients 130, 140, 150, provided clients 130, 140, or 150 trust the CA issuing short-lived certificate 117 (e.g., via a CA public key installed in web-browser 135, 145, or web-client 155 used to validate a CA signature listed in short-lived certificate 117). In addition, a public key listed in short-lived certificate 117 is used in a protocol allowing clients 130, 140, 150 to establish a secure (i.e., encrypted) communication session with the web server 115 (e.g., SSL or TLS sessions).

When the operator of web-server 115 first enrolls with a certificate authority (CA) and requests a digital certificate, the operator goes through a full identity investigation and authentication process. Once complete, the CSR generator 119 can generate a CSR to send to an enrollment component 106 of CA server 105. CSR generator 119 provides a component of web-server 115 (or plug-in) used to generate a certificate signing request (CSR). In one embodiment, the CSR may be formatted according to the PKCS 10 standard, and includes an asymmetric public key. To request a certificate, the CSR generator 119 first generates a private/public key pair. The public key and desired certificate attributes are stored in the CSR. For the first short-lived certificate 117, the CSR generator 119 signs the certificate using the private key (creating a first signature). The CSR is then sent to the CA server 105. CA server then issues short-lived certificate 117 with a validity period of N days/weeks, where N is configured according to user preference. For convenience of description, a validity period of seven days (N=7) is used as an example.

For each subsequent short-lived certificate, the CSR generator 119 generates a new key pair, constructs a CSR which includes the new public key (key N)$^{th}$. The content of the CSR, excluding the attributes, is hashed and signed with the private key (N-1)$^{th}$ of the current short-lived valid certificate 117 to create a second signature. The certificate 117 is currently deployed on server system 115. This second signature is included as part of the CSR attributes. The content of the CSR, with the attributes, is now hashed and signed a second time, using the new private key (key N)$^{th}$, which associates with the public key in the CSR. The CSR is now sent to the Certificate Authority for obtaining the next short-lived certificate (N)$^{th}$.

In one embodiment, an implementation of keygen (for Java), openssl (for Apache), certutil (for IIS), may be modified to keep track of which private key corresponds to the current short-lived certificate 117 and to use this key to generate the second signature for a new CSR. Alternatively, a CSR generated by these (or other) utilities may be modified by another process prior to being submitted to the enrollment component 106.

The resulting twice-signed CSR is then sent to the CA server 105. After issuing the initial short-lived certificate 117, subsequent certificates generated for the same end-entity (e.g., the same web-server 115) go through an automated approval process to ensure that certificate fulfillment happens before the current short-lived certificate expires. Since subsequent certificates do not go through the same authentication process as the initial one, the second signature included in each subsequent CSR is used to prove that the web server 115 holds the private key corresponding to the current short-lived certificate. In one embodiment, the CSR generator 119 requests a new short-lived certificate 117 at a specified time prior to the expiration of the current short-lived certificate 117. For example, for a short-lived certificate with a validity period of seven days, a new short-lived certificate could be requested two days before the current one expires.

As shown, the CA server 105 includes the enrollment component 106, issued certificates 107, and a certificate revocation list (CRL) 108. In one embodiment, the enrollment component 106 provides one or more software applications used by the CA to receive certificate signing requests (CSRs) and issue digital certificates. In addition, the enrollment component 106 may be configured to identify a request for a new short-lived certificate 117, signed both by the private key associated with the public key to be named in the new short-lived certificate and by the private key associated with a current short-lived certificate. When the enrollment component receives such a CSR, the first signature is validated using the public key named in the CSR. The second signature is validated using a public key named in the previous certificate issued to the same entity (e.g., to the same web server 115) named in the current CSR. Such a certificate may be stored in issued certificates 107.

Further, in one embodiment, subject identification attributes or data, such as the subject distinguished name in the new CSR, is ignored, and the corresponding information from the prior certificate is listed in the new short-lived certificate. For example, the subject distinguished name fields from the initial short-lived certificate may be propagated to the second short-lived certificate, and subsequently from the second to the third, etc. Doing so prevents an individual with access to a valid short-lived certificate (and corresponding private key) from obtaining a certificate for different end-entity.

CRL 108 provides a list of digital certificates that have been expressly revoked, e.g., either by the subject named in the certificate or the CA. In one embodiment, the current certificate needs to be valid (and not revoked) when a request for a subsequent short-lived certificate is received by the enrollment component 106 by the CA.

Figure 2:
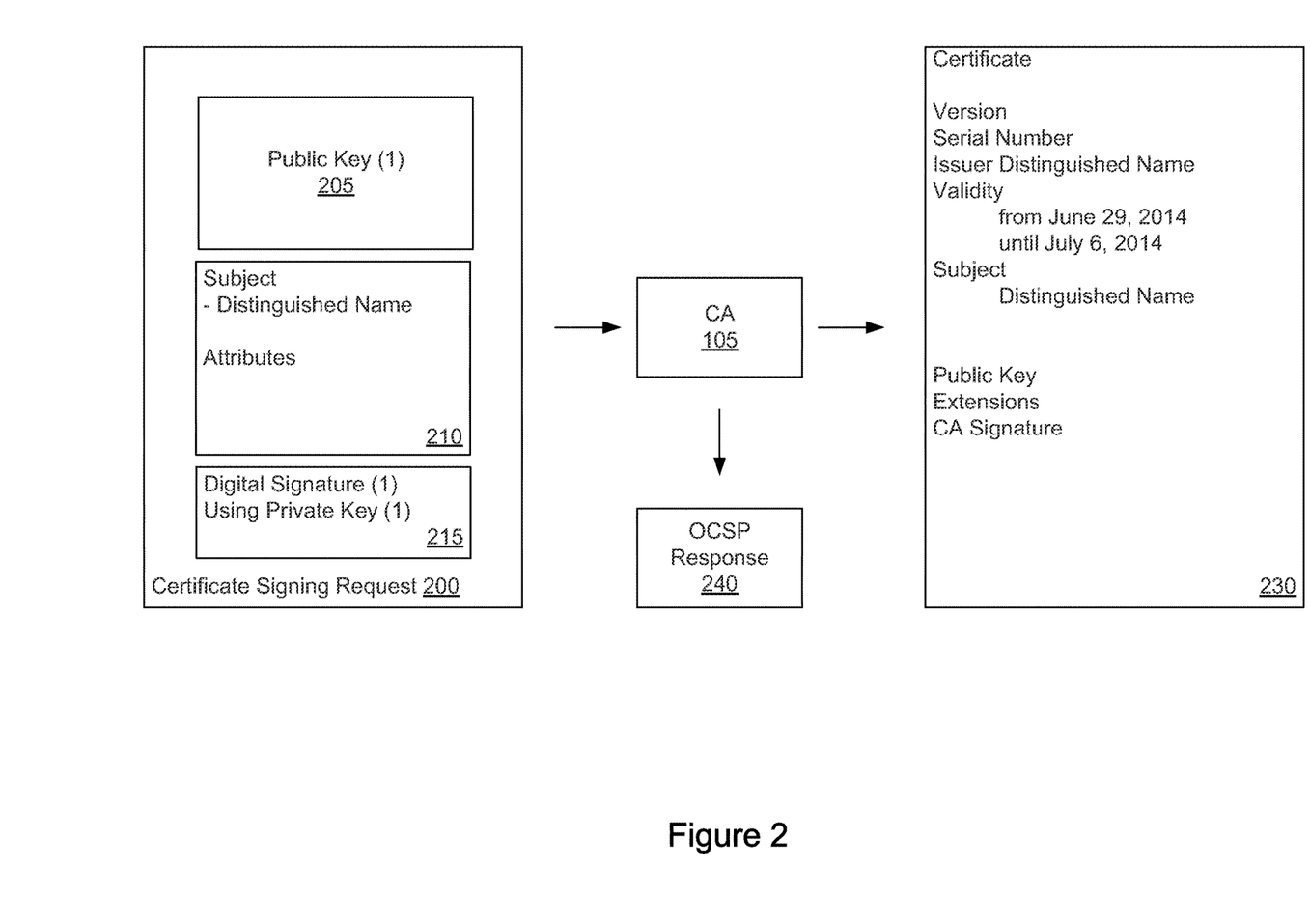
FIG. 2 illustrates an example certificate signing request (CSR), according to one embodiment.

FIG. 2 illustrates an example certificate signing request (CSR) 200, according to one embodiment. In this example, CSR 200 corresponds to an initial request for a short-lived certificate after the issuing CA has vetted a requesting party. As shown, the CSR 200 includes a public key (1) 205 a subject distinguished name, which includes a common name, and attributes 210 related to the certificate being requested. For example, a PKCS #10 certificate request includes a subject distinguished name (DN), a public key, optional attributes, and a signature. The subject DN itself includes multiple subfields, such as a common name, an organization, etc. Of course, CSR 200 may be presented in different formats according to various RFC standards.

As shown, the CSR 200 includes a digital signature (1) 215 over the content of the CSR 200. For example, in one embodiment, subject distinguished name, the public key, and attributes are hashed and the resulting hash value is signed (i.e., encrypted) using the private key (1) corresponding to the public key (1) named in the certificate. To validate the signature, the CA can then recover the hash value from the digital signature (1) 215 and compute a hash value form the certificate request content. Provided the hash values match, the signature is valid.

Once generated, the requesting party (e.g., web server 115) sends the CSR 200 to the CA 105, which issues certificate 230. As shown, the certificate 230 includes a version, serial number, a validity period, extensions, along with the subject fields and the public key presented to clients. In this example, the certificate 230 is the first short-lived certificate issued by the CA and includes a validity period of seven days. In addition, the certificate 230 includes a CA signature used by relying parties to confirm the validity of the certificate. The certificate 230 itself may be represented in any suitable format (e.g., according to the PKCS standards) and encoded using any feasible format (e.g., a .DER or .PEM encoding).

In addition to generating the certificate 230, the CA may also generate an OCSP response confirming the validity of the certificate. The CA or an OCSP responder managed by the CA may cache such a response. Doing so allows requests to confirm the validity of the certificate 230 to be processed efficiently. Note, the validity period for an OCSP response is typically shorter than the validity period of the certificate itself. Also, the certificate issuing CA may sign OCSP responses for a short-lived certificate instead of a dedicated OCSP response signer. That is, the same CA private key used to sign certificate 230 may be used to sign response 240. Doing so reduces OCSP response size and an extra OCSP responder signature validation, thereby improving SSL/TLS handshake performance (particularly for client devices with less processing capability).

Figure 3:
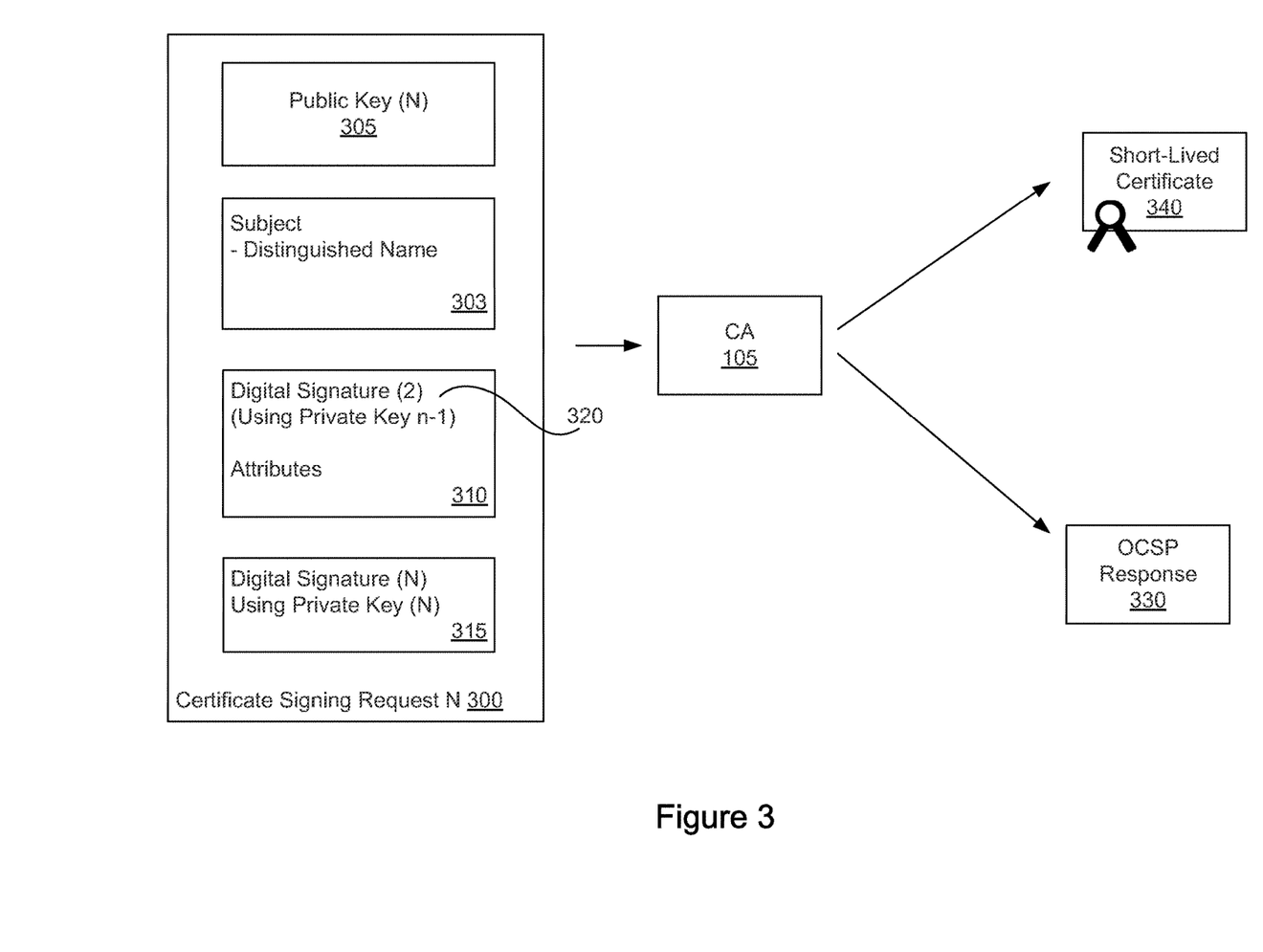
FIG. 3 illustrates another example certificate signing request (CSR), according to one embodiment.

FIG. 3 illustrates another example certificate signing request (CSR) 300, according to one embodiment. In this example, CSR 300 corresponds to a request to replace a current short-lived certificate. That is, CSR 300 corresponds to a certificate request for a short-lived certificate subsequent to the initial short-lived certificate (i.e., certificate 230). As shown, the CSR 300 includes a public key (N) 305, where N refers to the $N^{th}$ public key and $N^{th}$ short-lived certificate. CSR 300 also includes a subject distinguished name 303, any optional attributes 310, and digital signature (N) 315. Attributes 310 can include any information supported by a particular CSR standard. (e.g., as specified by the PKCS #10 certificate signing request standard).

Like, CSR 200, CSR 300 includes a digital signature (N) 315 constructed from the certificate content and private key corresponding to public key (N) 305. In addition, attributes 310 also includes a second digital signature 320. In one embodiment, the second digital signature 320 is created using the content of the certificate request 300, excluding the attributes 310. The second digital signature 320 is created using the private key of a current short-lived certificate (represented in FIG. 3 as private key N−1). For example, assume CSR 300 is for a second short-lived certificate following the initial certificate signing request (CSR 200). In such a case, the second digital signature 320, is constructed using the private key corresponding to the public key named in certificate 230.

In one embodiment, the CA validates both signatures in the CSR before issuing the next short-live certificate. The first signature validation (i.e. of digital signature (N) 315) is done by recovering a hash from the first signature via decryption with the public key in the CSR. This hash is compared against a hash constructed by the CA, using the content of the CSR content with the attributes. The second signature (i.e. of digital signature (2) 320) is validated by using the public key of the current short-lived certificate to decrypt the second signature to recover the second hash. This hash is compared against the hash constructed by the CA, using the content of the CSR (excluding the attributes).

Once generated, the requesting party (e.g., web server 115) sends the CSR 300 to the CA 105, which issues short-lived certificate 340. Like certificate 230, the certificate 340 may include version information, a serial number, issuer distinguished name, a validity period, subject distinguished name, extensions, and the public key presented to clients. Certificate 340 also includes a CA signature used by relying parties to confirm the validity of the certificate 340. Certificate 340 may be represented in any suitable format (e.g., according to the PKCS standards) and encoded using any feasible formats (e.g., a .DER or .PEM encoding). When certificate 340 nears expiration, the web-server generates a new private/public key pair (N−1) and certificate signing request (CSR) (N+1). The private key corresponding to the public key N listed in certificate 340 is then used to create the second signature.

In addition to generating the certificate 340, the CA may also generate an OCSP response confirming the validity of certificate 340. As with OCSP response 240, the validity period for OCSP response 340 may be set to be shorter than the validity period of the certificate 340, and may be signed by the issuing CA.

Figure 4:
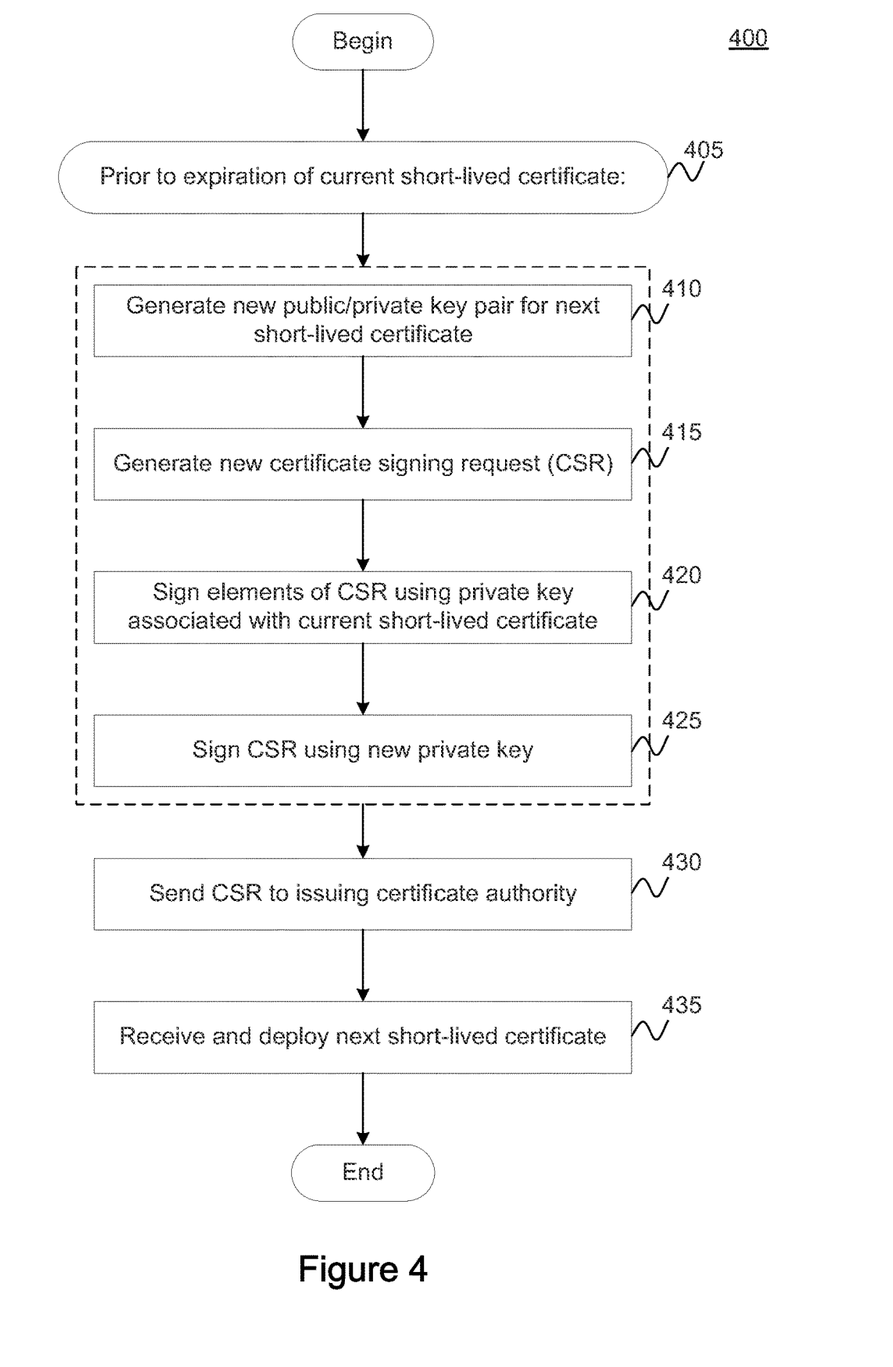
FIG. 4 illustrates a method for generating a certificate signing request CSR), according to one embodiment.

FIG. 4 illustrates a method 400 for generating a certificate signing request CSR) for a short-lived certificate, according to one embodiment. Note, method 400 assumes a requesting party has undergone a complete identify investigation and authentication process and been issued, at least, an initial short-lived certificate.

As shown, the method 400 begins at step 405, where prior to the expiration of a current short-lived certificate, the requesting party (e.g., web-server 115) generates a new CSR to send to the CA. Doing so includes steps 410-425.

At step 410, the web-server (or other application on a client system hosting a short-lived certificate) generates a public/private key pair. As noted, the server key pairs are generated more often for short-lived certificates ad each key pair only protects a smaller set of SSL transactions. This limits the time windows for intensive cryptanalytic attacks and, as a result, the key pairs can be shorter than typically used for certificates with long validity periods (e.g., one or more years) validity periods. After generating the key pair, the server generates a new certificate signing request (step 415). As noted, the CSR can list the public key generated at step 410 along with a set of subject attributes. At step 420, the server signs some content of the CSR using a private key associated with a current short-lived certificate, e.g., the server may sign the content of the CSR, excluding the attributes. At step 425, the server signs the CSR using the private key generated at step 410.

After the CSR is generated (steps 410, 415, 420, and 425), the server sends the twice-signed CSR to the issuing certificate authority (step 430). Provided the current short-lived certificate is valid (and not revoked), and the signatures are validated by the issuing CA, then the CA issues the requested short-lived certificate. At step 435, the server receives and deploys the short-lived certificate issued by the CA.

Figure 5:
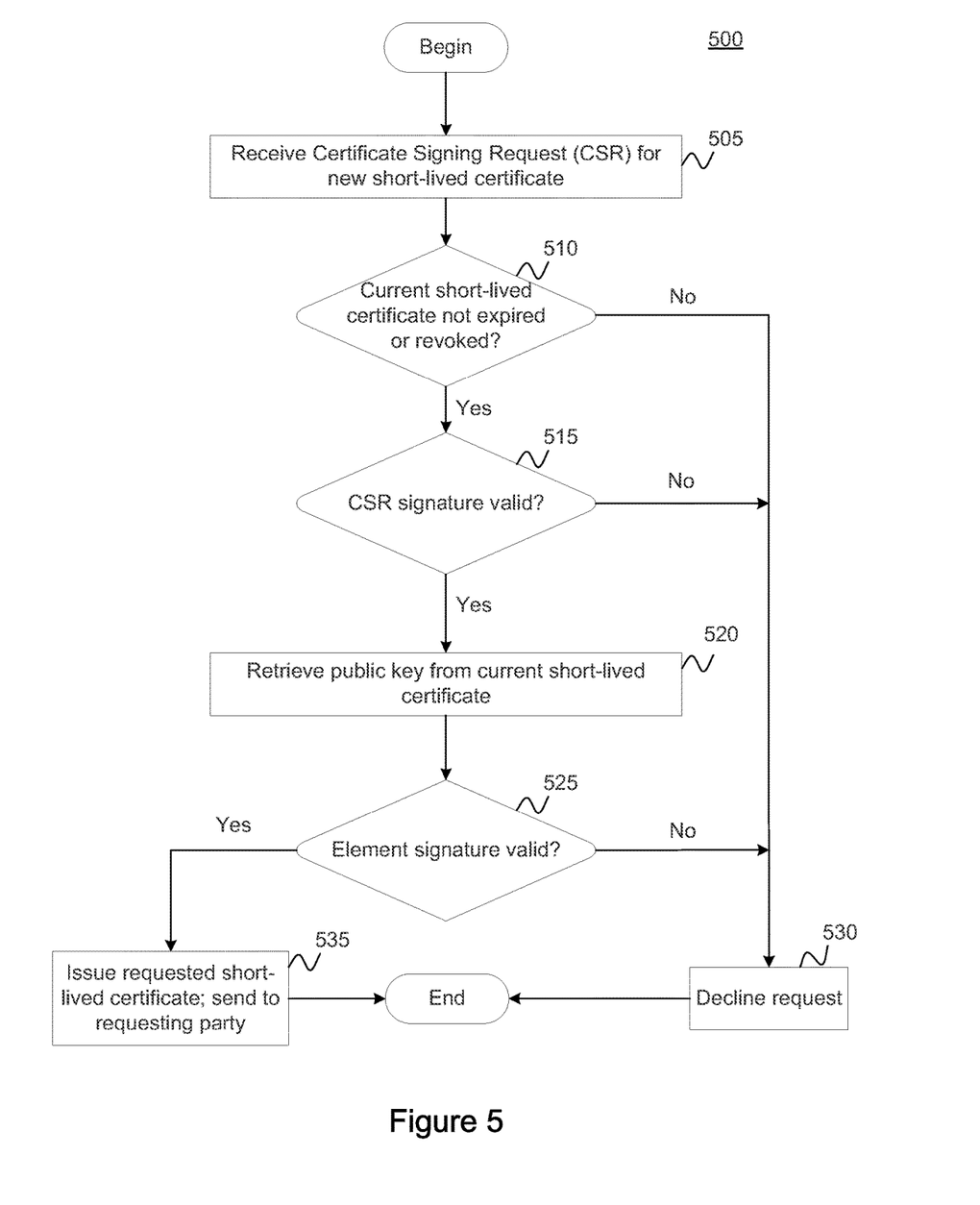
FIG. 5 illustrates a method for a certificate authority to automatically issue a sequence of short-lived digital certificates, according to one embodiment.

FIG. 5 illustrates a method 500 for a certificate authority to automatically issue a sequence of short-lived digital certificates, according to one embodiment. Note, method 500 assumes a requesting party has undergone a complete identify investigation and authentication process and been issued, at least, an initial short-lived certificate.

As shown, the method 500 begins at step 505 where an enrollment component at a (CA) receives a request for a new short-lived certificate (e.g., CSR 300 shown in FIG. 3). At step 510, the enrollment component at the CA confirms that the current short-lived certificate has not expired and has not been revoked. In one embodiment, the enrollment component identifies the current short-lived certificate using information from the subject distinguished name fields of the CSR and matches this to prior certificates issued by the CA. If the current short-lived certificate is either expired or revoked, the enrollment component declines to issue the certificate requested in the CSR (step 530).

Otherwise, assuming the current short-lived certificate is valid (and not revoked), at step 515, the enrollment component validates a first signature included in the CSR. If the first signature is invalid, the CA declines to issue the certificate requested in the CSR (step 530). As noted, the first signature is generated using the private key corresponding to the public key listed in the CSR over the contents of the CSR.

At step 520, the CA retrieves the public key from the current short-lived certificate and uses this key to validate the second signature included in the CSR (step 525). If the CSR signature is invalid, the CA declines to issue the certificate requested in the CSR (step 530). As noted, the signature is generated using a private key corresponding to the then current short-lived certificate over some portions of content included in the CSR.

At step 535, when the tests of steps 510, 515, and 525 are successful, then the enrollment component issues the requested short-lived certificate sends this certificate to the requesting party. As noted, in one embodiment the subject distinguished name information from the current short-lived certificate is used in the new short-lived certificate being issued.

Figure 6:
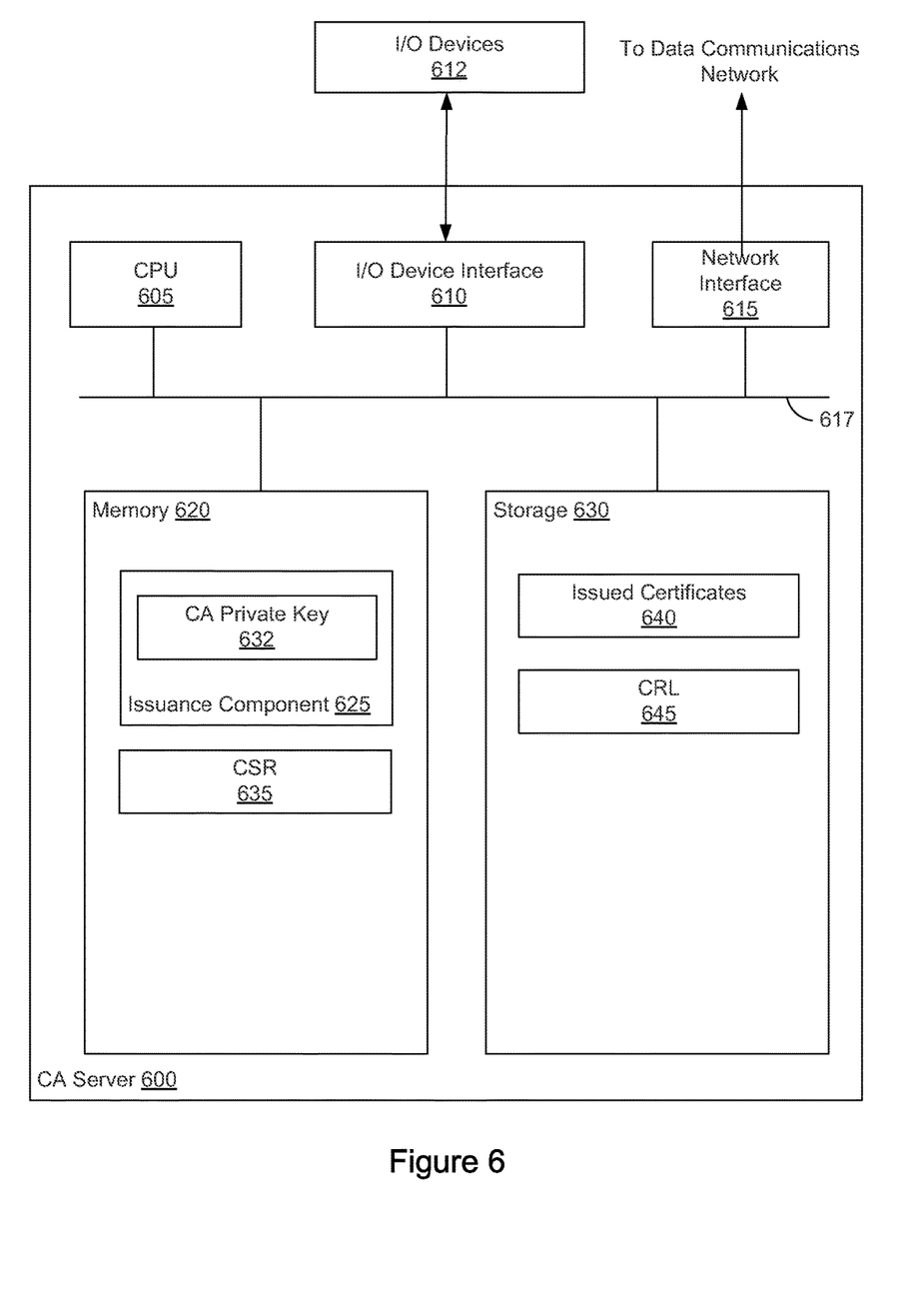
FIG. 6 illustrates an example computing system configured to automatically issue a sequence of short-lived digital certificates, according to one embodiment.

FIG. 6 illustrates an example certificate authority (CA) computing system 600 configured to automatically issue a sequence of short-lived digital certificates, according to one embodiment. As shown, the computing system 600 includes, without limitation, a central processing unit (CPU) 605, a network interface 615, a network interface 615, a memory 620, and storage 630, each connected to a bus 617. The computing system 600 may also include an I/O device interface 610 connecting I/O devices 612 (e.g., keyboard, display and mouse devices) to the computing system 600. Further, in context of this disclosure, the computing elements shown in computing system 600 may correspond to a physical computing system (e.g., a system in a data center) or may be a virtual computing instance executing within a computing cloud.

The CPU 605 retrieves and executes programming instructions stored in the memory 620 as well as stores and retrieves application data residing in the memory 630. The interconnect 617 is used to transmit programming instructions and application data between the CPU 605, I/O devices interface 610, storage 630, network interface 615, and memory 620. Note, CPU 605 is included to be representative of a single CPU, multiple CPUs, a single CPU having multiple processing cores, and the like. And the memory 620 is generally included to be representative of a random access memory. The storage 630 may be a disk drive storage device. Although shown as a single unit, the storage 630 may be a combination of fixed and/or removable storage devices, such as fixed disc drives, removable memory cards, optical storage, network attached storage (NAS), or a storage area-network (SAN).

Illustratively, the memory 620 includes a certificate signing request 635 and a certificate enrollment and issuance component 625. As shown, the enrollment component 625 has access to a CA private key 630. The CA private key 630 is used to sign certificates issued by the enrollment component of CA server 600. And storage 630 includes issued certificates 640 and CRL 645. The issued certificates 640 include all the certificates issued by the CA that are currently valid, based on the validity periods identified in the certificates. The CRL is a list of certificates within an active validity period (i.e., not expired), but which the owner of the certificate or the CA has expressly revoked.

As described, embodiments presented herein provide techniques for a certificate authority to issue short-lived SSL certificates and an authentication method for validating certificate signing requests (CSR) for short-lived certificates. Advantageously, using short-lived certificates, as described above, server key pairs are generated much more frequently than typically occurs. As a result, each key pair protects a smaller set of transactions. Doing so mitigates the additional risk factor posed by cloud computing (i.e., where a web server is hosted on a virtual machine instance in the cloud and the operator of that web server does not control the physical security of the system hosting the virtual machine instance). Further, web servers may use smaller key sizes to maintain high performance, yet still have the strong security level by generating new key pairs more often to shorten the exposure window. That is, the short validity period limits the time window for an intensive cryptanalytic attack against a server's then current private key. Thus, the server can support larger numbers of substantially simultaneous sessions. Similarly, client devices with limited computing power (e.g., unconventional network aware devices such as thermostats, lighting, and appliances) can negotiate a secure session more efficiently.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function (s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Users can access any of the computing resources that reside in the cloud at any time, from anywhere across the Internet. For example, in context of this disclosure, a web-server controlled and operated by one party, but hosted on a cloud-computing environment, could generate a sequence of certificate signing requests (CSRs) sent to a CA. Each CSR is singed using a private key corresponding to the public key listed in the CSR, as well as signed using a private key corresponding to a current valid short-lived certificate. That is, if a CSR is requesting the $N^{th}$ certificate, then the CSR is signed using both private key N and private key N−1. Subsequently, when the $N^{th}$ certificate nears expiration, a new CSR is generated and signed using private key N and N+1. This process repeats so long as a new short-lived certificate is requested prior to the expiration of the current one.

While the foregoing is directed to embodiments of the present invention, other and further embodiments of the invention may be devised without departing from the basic scope thereof, and the scope thereof is determined by the claims that follow.

What is claimed is:

1. A computer-implemented method for issuing a sequence of short-lived digital certificates, the method comprising:
   receiving, from a computing device associated with a party, a certificate signing request (CSR) that includes a public key to be listed in a first digital certificate, that is signed using at least a first private key and at least a portion of the CSR to generate a first digital signature, and that is signed using at least a second private key and at least a portion of a first version of the CSR to generate a second digital signature and a second version of the CSR that includes the second digital signature;
   validating that the first digital signature was generated using the first private key, the first private key corresponding to the public key to be listed in the first digital certificate;
   validating that the second digital signature was generated using the second private key, the second private key corresponding to a public key listed in a second digital certificate previously issued to the party; and
   based on validating that the first digital signature was generated using the first private key and validating that the second digital signature was generated using the second private key, issuing the first digital certificate to the party.

2. The method of claim 1, wherein the first digital signature is generated by signing, with the first private key, the second version of the CSR that includes the second digital signature to generate a third version of the CSR that includes both the first and second digital signatures, and wherein receiving the CSR comprises receiving the third version of the CSR.

3. The method of claim 1, wherein receiving the CSR comprises receiving the second version of the CSR.

4. The method of claim 1, further comprising prior to issuing the first digital certificate, determining that the second digital certificate is currently valid and not revoked.

5. The method of claim 1, further comprising, including a subject distinguished name in the first digital certificate from the second digital certificate.

6. The method of claim 1, wherein attributes listed in the CSR also include the second digital signature.

7. A non-transitory computer-readable storage medium storing instructions, which, when executed on a processor, performs an operation for issuing a sequence of short-lived digital certificates, the operation comprising:
   receiving, from a computing device associated with a party, a certificate signing request (CSR) that includes a public key to be listed in a first digital certificate, that is signed using at least a first private key and at least a portion of the CSR to generate a first digital signature, and that is signed using at least a second private key and at least a portion of a first version of the CSR to generate a second digital signature and a second version of the CSR that includes the second digital signature;
   validating that the first digital signature was generated using the first private key, the first private key corresponding to the public key to be listed in the first digital certificate;
   validating that the second digital signature was generated using the second private key, the second private key corresponding to a public key listed in a second digital certificate previously issued to the party; and based on validating that the first digital signature was generated using the first private key and validating that the second digital signature was generated using the second private key, issuing the first digital certificate to the party.

8. The non-transitory computer-readable storage medium of claim 7, wherein the first digital signature is generated by signing, with the first private key, the second version of the CSR that includes the second digital signature and generating a third version of the CSR that includes both the first and second digital signatures and wherein receiving the CSR comprises receiving the third version of the CSR.

9. The non-transitory computer-readable storage medium of claim 7, wherein receiving the CSR comprises receiving the second version of the CSR.

10. The non-transitory computer-readable storage medium of claim 7, wherein the operation further comprises, prior to issuing the first digital certificate, determining that the second digital certificate is currently valid and not revoked.

11. The non-transitory computer-readable storage medium of claim 7, wherein the operation further comprises, including a subject distinguished name in the first digital certificate from the second digital certificate.

12. The non-transitory computer-readable storage medium of claim 7, wherein attributes listed in the CSR also include the second digital signature.

13. A system, comprising:
a processor; and
a memory storing computer-executable instructions, which, when executed by the processor, causes the processor to perform an operation for issuing a sequence of short-lived digital certificates, the operation comprising:
    receiving, from a computing device associated with a party, a certificate signing request (CSR) that includes a public key to be listed in a first digital certificate, that is signed using at least a first private key and at least a portion of the CSR to generate a first digital signature, and that is signed using at least a second private key and at least a portion of a first version of the CSR to generate a second digital signature and a second version of the CSR that includes the second digital signature,
    validating that the first digital signature was generated using a first private key, the first private key corresponding to the public key to be listed in the first digital certificate,
    validating that the second digital signature was generated using a second private key, the second private key corresponding to a public key listed in a second digital certificate previously issued to the party, and
    based on validating that the first digital signature was generated using the first private key and validating that the second digital signature was generated using the second private key, issuing the first digital certificate to the party.

14. The system of claim 13, wherein the first digital signature is generated by signing, with the first private key, the second version of the CSR that includes the second digital signature to generate a third version of the CSR that includes both the first and second digital signatures, and wherein receiving the CSR comprises receiving the third version of the CSR.

15. The system of claim 13, wherein receiving the CSR comprises receiving the second version of the CSR.

16. The system of claim 13, wherein the operation further comprises, prior to issuing the first digital certificate, determining that the second digital certificate is currently valid and not revoked.

17. The system of claim 13, wherein the operation further comprises, including a subject distinguished name in the first digital certificate from the second digital certificate.

18. The system of claim 13, wherein attributes listed in the CSR include the second digital signature.

* * * * *